United States Patent Office 2,801,509
Patented Aug. 6, 1957

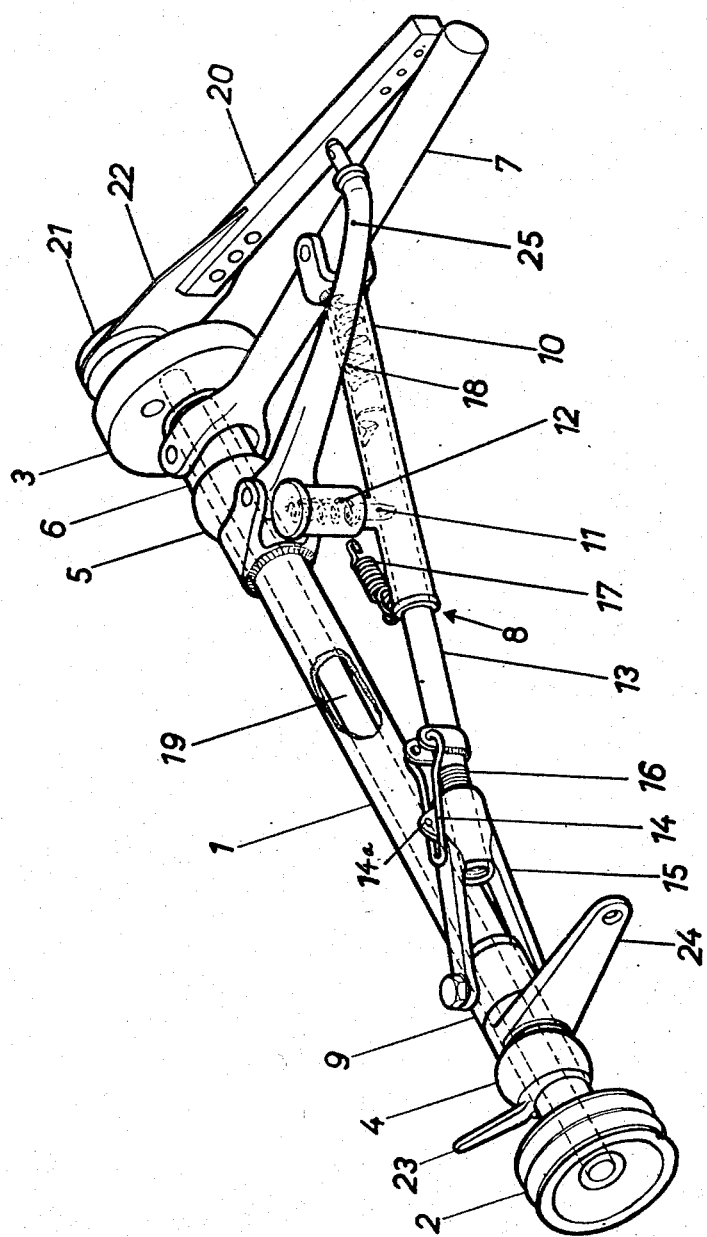

2,801,509

DEVICE FOR SECURING, DRIVING, AND LIFTING A MOWER ASSEMBLY ON A TRACTOR

Willi Ernst Salzmann, Solothurn, Switzerland

Application August 22, 1952, Serial No. 305,733

Claims priority, application Switzerland August 27, 1951

15 Claims. (Cl. 56—25)

This invention relates to devices for use in securing, driving and lifting side-mounted mowers on tractors of the kind having a rear or front power take-off.

It has been proposed to provide such a device comprising a transmission shaft arranged at least substantially parallel to the longitudinal axis of the tractor and driving the knife of the mower cutter bar (which is mounted laterally and raisably between the front and rear wheels of the tractor) by means of a crank wheel and pitman rod.

One object of the invention is to provide an improved device which is compact and very easily attached to and removed from a tractor. A further object of the invention is to provide a device for use on a tractor having an initially incorporated or subsequently added hydraulic, pneumatic or mechanical power lift, although alternatively the tractor may be provided exclusively or in addition with a hand lift. Yet another object is to provide a device which may be so constructed as to incorporate an effective safety device for the cutter bar.

According to the invention a device for use in securing, driving and lifting a side-mounted mower on a tractor of the kind having a rear or front power take-off, the said device comprising a transmission shaft arranged at least substantially parallel to the longitudinal axis of the tractor and driving the knife of the mower cutter bar (which is mounted laterally and raisably between the front and rear wheels of the tractor) by means of a crank wheel and pitman rod, is characterized in that the transmission shaft is mounted within a protecting tube which is rotatably secured to the tractor in a readily detachable manner and carries the supporting bar for the cutter bar, there being fixed to the said tube at least two levers of which one is operatively connected to the lifting device of the tractor and the other is operatively connected to the double lever raising assembly of the cutter bar hinge, the arrangement being such that the said tube acts simultaneously as a frame tube for the cutter bar and as a torsion tube for the cutter bar lifting device. Further features of the invention appear from the following description read in conjunction with the drawing and the claims.

One device according to the invention is illustrated by way of example in the accompanying drawing in which the figure is a partly diagrammatic perspective view of the device as seen from a point at the rear and on the outer side of the device.

The device shown in the said drawing is intended to be used in connection with a side-mounted raisable mower which is an accessory which can be fitted to and removed from tractors which are in common use at present and comprise rear power take-off shafts and rear hydraulic power lifts, for example the tractors sold under the trade name of Ferguson. In order to make the illustration clear there are shown in the drawing only the parts of the device according to the invention, namely the combined securing, driving and lifting device for the cutter bar, but the cutter bar itself with its hinge and the tractor with its power take-off shaft and the securing elements for the cutter bar are not shown; also for the sake of clarity the drawing is somewhat diagrammatic.

Referring to the said drawing, the device according to the invention comprises a tube 1 which is arranged at least substantially parallel to the longitudinal axis of the tractor and extends between a belt pulley 2 and a flywheel or crank wheel 3. On the tube 1 are two freely rotatable bushes or sleeves 4 and 5 with spherical external surfaces. On the tractor at the appropriate places are secured two hemispherical sockets in which the spherical sleeves 4 and 5 are placed and firmly fixed by means of hemispherical caps or retainers with suitable securing means such as screws or bayonet locks, the arrangement being such that the tube 1 is secured to the tractor by means of two enclosed or locked ball joints, but the tube 1 can rotate in the cylindrical internal bores of the spherical sleeves 4 and 5. The tube 1 is thus secured to the tractor in a manner which makes the mounting of the tube on the tractor and its removal quite simple. The above structure is largely conventional, as shown in the patent to Gillespie 2,628,467 entitled "Mower attachment for tractors." The tube 1 carries a freely rotatable sleeve 6 to which is pivoted a short supporting bar 7 (to which is secured the hinge of the cutter bar, these parts not being shown). The supporting bar 7 normally extends substantially perpendicularly to the tube 1 and is held in this position by a telescopic strut 8 which is pivotally connected to the bar 7 and is also pivotally connected to a sleeve 9 which is secured so as to be freely rotatable on the tube 1.

This strut 8 consists of a tube 10 pivoted to the supporting bar 7 and an over-load release mechanism comprising a locking plunger 11 engaging under the pressure of a spring 12 in notches in a rod 13, and when an over-load arises in consequence of the cutter bar encountering an obstacle the locking plunger 11 is forced out of the notch so that the strut 8 telescopes and the supporting bar 7 can swing backwards (or forwards) by virtue of its pivotal connection to the tube 1. For the purpose of simplifying the mounting of the device on the tractor, the locking plunger 11 can be disengaged by hand so that the strut 8 can operate telescopically and consequently the tube 1 can move relatively to the shaft 19, which greatly facilitates the guiding of the spherical sleeves 4 and 5 into the spherical sockets secured to the tractor. For this purpose the rod 13 is provided with a lever 14 and is rotatably secured in a fork 15 in such a way that by rotating the rod 13 within the tube 10 the locking plunger 11 is forced out of the notch in the rod 13. According to the example illustrated, the end portion of the rod 13 is provided with a screw-thread 16 by means of which the rod 13 is rotatably connected to the fork 15. By turning the lever 14 it is thus possible without tools to adjust the length of the strut 8 and thus the angle of the cutter bar relative to the longitudinal axis of the tractor. This constructional solution provides as can be seen from the drawing a pivotable loop-shaped hand lever 14 which encircles a lug 14a on the fork 15 and is there secured by means of a pin (not shown) passed through a hole in the lug. By this means there is prevented simultaneously both an inappropriate rotation of the rod 13 in the tube 10 and also an excessive screwing out of the rod 13 from the fork 15. Upon swinging of the supporting bar 7 in consequence of the cutter bar encountering an obstruction, motion is transmitted from the supporting bar 7 by means of a transmission element (not shown, for example a wire rope) and an interposed resilient member (a spring 17) to the clutch pedal of the tractor, and the swinging motion is damped or absorbed by a compression spring 18.

The driving of the cutter bar or its knife mounted on the tractor by means of the described device is effected from a belt pulley secured to the power take-off shaft through transmission elements such as V-belts (not shown) driving the belt pulleys 2 which are secured to a transmission shaft 19 rotatably mounted within the tube 1 and carrying the crank wheel 3, the power being transmitted from here through a connecting or pitman rod 20 to the head of the knife in known manner. With the drive transmission means (tube 1) mounted laterally of the tractor housing, it is usually not possible to obviate an extremely large inclination of the pitman rod 20 relatively to the direction of movement of the knife; it is then necessary to connect the pitman rod 20 not directly to the head of the knife but to insert a link and a swinging lever pivoted to the hinge of the cutter bar, whereby the knife is relieved of the vertical components of the driving forces in the rod 20 which components are in some circumstances impermissibly large, and in addition the knife is at least approximately immobilised in spite of continued rotation of the crank wheel when the cutter bar is completely raised. When the cutter bar swings backwardly (for example on encountering an obstacle) the sideways swinging of the pitman rod 20 is permitted by means of a leaf spring 22 arranged between the pitman rod 20 and the pitman head 21. In order to prevent damage to the knife the belt drive from the power take-off shaft of the tractor to the belt pulleys 2 can be caused to act as an adjustable over-load clutch by virtue of the adjustability of the belt tension. Adjusting of the belt tension is effected by varying the distance between the axes of the power take-off shaft and the transmission shaft 19. For this purpose the cylindrical internal bore of the rear sleeve 4 is arranged eccentrically to the spherical external surface thereof. Before the two spherical sleeves 4 and 5 are tightly clamped the sleeve 4 is rotated by means of a hand lever 23 in the spherical socket secured to the tractor until the belt tension is correctly adjusted. The subsequent tight clamping of the sleeve 4 prevents an inadvertent mis-adjustment. On the spherical socket may be index marks (not shown) permitting the exact adjustment of the appropriate belt tension at any subsequent mounting of the mowing apparatus on the tractor. For the purpose of damping out as far as possible the transmission of the inavoidable vibrations of the crank drive to the tractor, at least the front one of the two spherical sleeves 4 and 5 is provided with a tubular rubber insert. Alternatively the spherical outer part of the sleeve 5 can consist entirely of resilient material, this part surrounding the tube 1 by means of a metal sleeve vulcanised therein. In consequence of the resilience of the rubber the sleeve 5 may have a cylindrical or other shape, for example that of two cones placed base to base, instead of a spherical outer surface.

The transmission of the lifting motion from the hydraulic power lift built into the rear part of the tractor is effected through a tension or compression member (not shown) connected to a rear lever 24 rigidly secured to the tube 1, the tube 1 itself transmitting the motion to a front lever 25, the lever 25 being likewise secured to the tube 1 so as to be incapable of rotation relative to the tube 1, the lever 25 having its outer end connected to the double lever raising assembly of the hinge. In order to permit lateral swinging of the cutter bar upon encountering an obstruction, the front lever 25 is laterally pivotally connected to the tube 1, the tube 1 with levers 24 and 25 constituting a torsion linkage.

The tube 1 acting as a mounting for the transmission shaft 19 serves simultaneously as a fixing frame and lifting linkage for the cutter bar and is stressed in tension, compression, bending, thrust and torsion.

I claim:

1. A device for use in securing, driving, and lifting a side-mounted raisable mower on a tractor, comprising in combination a protecting tube, said tube being detachably securable to the tractor at least approximately parallel to the longitudinal axis of the tractor and rotatable about its own longitudinal axis, a supporting bar attached to said tube, a first lever secured to said tube and operatively connectable to the lifting device of the tractor, a second lever attached to said tube and operatively connectable to the cutter bar raising assembly, and a cutter bar drive transmission shaft rotatably mounted within said tube.

2. A securing, driving, and lifting device for a detachable side-mounted raisable tractor mower, comprising in combination two mounting sleeves, a tube located for rotation about its longitudinal axis in said mounting sleeves, a first lifting lever arm rigidly connected to said tube, a second lifting lever arm pivotally connected to said tube and pivoting about an axis transverse to said tube, a first loose sleeve on said tube, a supporting bar pivotally connected to said first loose sleeve, a second loose sleeve on said tube, a telescopic strut pivotally connected to said supporting bar and to said second loose sleeve, a transmission shaft extending rotatably through the length of said tube, at least one rotary drive element secured to one end of said transmission shaft, and a crank drive element secured to the other end of said transmission shaft.

3. A device as claimed in claim 2, said mounting sleeves having spherical external surfaces.

4. A device as claimed in claim 2, as least one of said mounting sleeves having an eccentric bore accommodating said tube.

5. A device as claimed in claim 2, as least one of said mounting sleeves being partly of resilient material.

6. A device as claimed in claim 2, at least one of said mounting sleeves being partly of rubber.

7. A device as claimed in claim 2, said telescopic strut comprising an inner element, an outer element, and spring catch means normally resisting relative motion of said inner element and outer element and permitting such relative motion on the occurrence of an overload.

8. A device as claimed in claim 2, said telescopic strut comprising a manually rotatable inner element, an outer element, and spring catch means preventing relative axial motion of said inner element and said outer element under normal load and permitting such relative axial motion under overload.

9. A device as claimed in claim 2, said telescopic strut comprising a manually rotatable inner element, an outer element, a hand lever pivotally connected to said inner element, a fork screw-threadedly connected to said inner element and pivotally connected to said second loose sleeve, and spring catch means preventing telescopic action of said strut under normal load and permitting such telescopic action under excess load.

10. A securing, driving, and lifting device for a moving apparatus to be deachably and raisably mounted on the side of a tractor, comprising in combination a rear mounting sleeve having a spherical outer surface and an eccentric bore, a handle rigidly secured to said rear mounting sleeve, a front mounting sleeve having a spherical outer surface and formed partly of rubber, a tube rotatably located in said rear mounting sleeve and said front mounting sleeve, a rear lever arm rigidly secured to said tube, a front lever arm pivotally connected to said tube for pivoting about an axis transverse to said tube, a rotatable front loose sleeve on said tube, a supporting bar pivotally connected to said front loose sleeve, a rear rotatable loose sleeve on said tube, a fork pivotally connected to said rear loose sleeve, a rod rotatably and screw-threadedly connected to said fork, a strut element sliding telescopically on said rod and pivotally connected to said supporting bar, a hand lever pivoted to said rod, spring catch means preventing telescopic movement of said strut element on said rod under normal load and permitting this telescopic movement under excess load, a transmission shaft rotatably mounted within and extending longitudinally through said tube, at least one belt pulley secured to one end of said transmission shaft, a crank drive element secured to the other end of said transmission shaft, a leaf spring operatively connected to said crank drive element, and a connecting rod secured to said leaf spring.

11. A device as claimed in claim 10, comprising also a projection on said fork, said hand lever being engageable on said projection for locking said rod against rotation.

12. A device as claimed in claim 10, comprising also a resilient tensile transmission element connected to said strut element for transmitting motion from said strut element to the tractor clutch mechanism.

13. A device as claimed in claim 10, comprising also resilient buffer means within said strut element.

14. A device as claimed in claim 10, said spring catch means comprising a locking plunger and a spring acting on said locking plunger to urge it into a notch in said rod, manual rotation of said rod forcing said locking plunger out of said notch.

15. In a mower for use with a tractor having a power take-off and a power lift device at its rear end, the combination comprising a tubular torque shaft extending from the rear end of the tractor to the mid-portion thereof and having means for rotatably mounting the same alongside the tractor body, a drag bar mounted on the forward end of the torque shaft, liftingly connected therewith; and extending laterally outwardly therefrom and having a cutter bar at its outboard end, means adjacent the rear end of the torque shaft for coupling the same to the power lift device on the tractor so that when the power lift device is operated, torque is transmitted to the drag bar for swinging the same upwardly with respect to the tractor, a drive shaft extending through said tubular torque shaft and having means at its rear end for coupling to the tractor power take-off, and means at the forward end of the drive shaft for drivingly connecting the same to the cutter bar.

References Cited in the file of this patent
UNITED STATES PATENTS

| | | |
|---|---|---|
| 2,311,117 | MacDonald et al. | Feb. 16, 1943 |
| 2,628,467 | Gillespie | Feb. 17, 1953 |